US005933764A

United States Patent [19]

Katayama

[11] Patent Number: 5,933,764

[45] Date of Patent: Aug. 3, 1999

[54] PASSWORD-PROTECTED PAGER

[75] Inventor: Hideyuki Katayama, Shizuoka, Japan

[73] Assignee: NEC Corporation, Tokyo, Japan

[21] Appl. No.: 08/861,771

[22] Filed: May 22, 1997

[30] Foreign Application Priority Data

May 28, 1996 [JP] Japan .................................... 8-133716

[51] Int. Cl.[6] ............................... H04B 7/00; G08B 5/22

[52] U.S. Cl. .................................... 455/38.4; 340/825.44; 340/825.31

[58] Field of Search .................................... 455/38.4, 566, 455/575, 186.1, 38.1, 31.1, 418; 340/825.44, 311.1, 825.51, 825.52, 825.31; 395/186, 188.01, 185.01

[56] References Cited

U.S. PATENT DOCUMENTS

| | | | |
|---|---|---|---|
| 5,023,905 | 6/1991 | Wells et al. | 379/93.17 |
| 5,073,767 | 12/1991 | Holmes et al. | 340/311.1 |
| 5,105,189 | 4/1992 | Murai et al. . | |
| 5,146,217 | 9/1992 | Holmes et al. | 340/825.44 |
| 5,247,519 | 9/1993 | Snowden et al. | 370/313 |
| 5,283,832 | 2/1994 | Lockhart, Jr. et al. | 380/49 |
| 5,373,289 | 12/1994 | Ichinohe | 340/825.56 |
| 5,396,264 | 3/1995 | Falcone et al. . | |
| 5,414,418 | 5/1995 | Andros, Jr. | 340/825.44 |
| 5,483,595 | 1/1996 | Owen | 380/23 |
| 5,550,535 | 8/1996 | Park | 340/825.44 |
| 5,694,120 | 12/1997 | Indekeu et al. | 340/825.44 |
| 5,798,708 | 8/1998 | Katayama | 340/825.44 |

FOREIGN PATENT DOCUMENTS

| | | |
|---|---|---|
| 62-219034 | 9/1987 | Japan . |
| 2 267 168 | 11/1993 | United Kingdom . |

OTHER PUBLICATIONS

Japanese Office Action Dated May 26, 1998 with English language translation of Japanese Examiner's comments.

*Primary Examiner*—Reinhard J. Eisenzopf
*Assistant Examiner*—Charles N. Appiah
*Attorney, Agent, or Firm*—Whitham, Curtis & Whitham

[57] ABSTRACT

A radio selective calling receiver protects security by remaining inoperable despite manipulation of switches by a third party. The receiver includes a switch state detector which detects the manipulated state of switches of the switch unit, and that, when functions are selected while a password input mode is in effect, withholds command input by selection switches when the correct password is not inputted, outputs the withheld command input when the correct password is inputted. The receiver also includes an input password judging unit which collates an input password with a collation password stored in a collation password memory, judges whether or not the inputted password is correct, and outputs a judgment result; a password input control unit that causes a display unit to display a request for password input when in the password input mode; a function/item selection control unit that outputs a selected function activation signal and a selected item command signal based on command input from the switch state detector; and a password input mode setting unit that sets or cancels the password input mode.

8 Claims, 3 Drawing Sheets

PASSWORD-PROTECTED PAGER

BACKGROUND OF THE INVENTION

1. Field of the Invention

The present invention relates to a radio selective calling receiver, and particularly to a radio selective calling receiver requiring input of a password in order to protect confidentality when using key input to operate the radio selective calling receiver.

2. Description of the Related Art

As shown in FIG. 1, a radio selective calling receiver of the prior art is made up of antenna 11 that receives radio waves from a base station, radio unit 12 that demodulates a radio frequency signal outputted from antenna 11 and outputs digital signals received from the base station, switching unit 13 for inputting data and commands for controlling the operation of the radio selective calling receiver which is provided with a plurality of switches for input of commands and data, display 14 for displaying information relating to the input of commands and data from switching unit 13 and information relating to the operating state of the radio selective calling receiver, speaker 15 for sounding an alarm to inform a user of the reception of an incoming call from a base station, memory for storing, for example, data inputted by a subscriber or received data from a base station, and control unit 1*b* for controlling the operation of each of the above-described components.

Radio waves transmitted to a subscriber carrying the radio selective calling receiver are received at antenna 11. These radio waves, which include a call signal and transmitted data from the base station, are modulated, and the call signal and transmitted data are demodulated and extracted at radio unit 12 and outputted to control unit 1*b*. In accordance with the call signal, control unit 1*b* displays a message on display 14 to indicate that a call has come in and sends a ringing signal to speaker 15. In addition, control unit 1*b* both stores the transmitted data that has been received from the base station to memory 16 and indicates the data on the display.

For received data requiring confidentiality, a step is performed whenever required at both the transmitting and receiving side to place a restriction on operation of the radio selective calling receiver, thereby preventing access to received data by a third party so as to maintain the confidentiality of received data handled by the radio selective calling receiver.

Japanese Patent Laid-open No. 219034/87 describes one example of the prior art in which input of a password is employed to maintain confidentiality. According to the prior art described in this document, a plurality of packages mounted in a device are interconnected by means of connectors; and when trouble occurs in which connectors experience temporary states of poor contact followed by automatic restoration of contact while the device is operating, the functioning of the device is temporarily degraded or halted and then returns to full operation. The effect of these interruptions appears in the data being handled, impedes reliability of the system, and reduces the protection of confidentiality. To prevent these problems, input of a password is therefore required to initiate a return to the operating state of the device.

No measures have been available for protection from access by a third party of highly confidential information including sensitive information such as highly confidential telephone numbers stored in the memory of a radio selective calling receiver by the user of the radio selective calling receiver, and extreme care has therefore been required with regard to the handling of a radio selective calling receiver containing data requiring high confidentiality.

In the above-described radio selective calling receiver of the prior art, manipulation of the operation switches results in immediate operation of the functions of the radio selective calling receiver that correspond to the manipulated switches. As a consequence, if the radio selective calling receiver is being used for communication of a confidential item, careless handling of the radio selective calling receiver, such as leaving the radio selective calling receiver unattended on a desk, may result in the breach of confidentiality through manipulation by a third party. In other words, great care must be taken in handling the radio selective calling receiver in order to prevent disclosure to a third party of confidential information such as a telephone number that has been previously stored in the memory of the radio selective calling receiver, and this necessary extra care is a major disadvantage of the prior art.

In addition, despite measures taken on the transmitting side to maintain confidentiality of a sent message, failure to take corresponding measures on the receiving side may still allow a third party to access the radio selective calling receiver and read the received message. This added danger of breached confidentially underscores the need for extreme care and the resulting inconvenience of using the radio selective calling receiver of the prior art.

SUMMARY OF THE INVENTION

The object of the present invention is to provide a radio selective calling receiver that, by failing to operate when manipulated by a third party, eliminates the possibility of disclosure of confidential information even in a case in which, due to careless handling of a radio selective calling receiver, a third party gains access to and manipulates the operation switches of the radio selective calling receiver.

The radio selective calling receiver of this invention is provided with a "password input mode" that requires input of a password when selecting functions, and a "password input not required mode" that does not require input of a password when selecting functions;

wherein when switches are manipulated to select functions when in the "password input mode," a message is displayed directing the input of the password, following which correct input of the password is checked before a function selected by the switches is activated; and when switches are manipulated to select functions when in the "password input not required mode," the selected functions are immediately activated, and moreover, setting and altering of the "password input mode" and the "password input not required mode" is effected in accordance with selections on a menu screen.

The radio selective calling receiver according to another embodiment of the present invention includes an antenna that receives radio waves from a base station, a radio unit that generates and outputs a digital signal transmitted from a base station by demodulating a radio frequency signal outputted from the antenna, a memory that stores data inputted from a subscriber and received data from a base station, and a control unit that controls the operation of each component; wherein when functions are selected, the control means executes differing control depending on whether a "password input mode" that requires input of a password or a "password input not required mode" that does not require input of a password is in effect; and said control means further comprises:

(A) function/item selection control means that controls selection and activation of functions as well as selection of selection items;

(B) display means that displays menu screens which are screens for selecting the functions and selection items;

(C) menu screen setting means that generates the menu screen;

(D) switch state detection means that detects the manipulated state of the switches; and which, if function selection switches are manipulated during a "password input mode" that requires input of a password when selecting functions, stores command input by the selection switches into the memory until input of a correct password, reads out the command input stored in the memory when the password is correctly inputted and outputs to the function/item selection control means; if function selection switches are manipulated during a "password input not required mode" that does not require input of a password when selecting functions, immediately outputs the command input to the function/item selection control means; and which, when a command input switch of a selection item is manipulated, immediately outputs to the function/item selection control means whether in the "password input mode" or the "password input not required mode";

(E) collation password storage means that stores in advance collation passwords for collating with an inputted password;

(F) input password judging means that collates a password inputted by the switches with a collation password that is read from the memory and judges whether there is matching or not, and outputs a judgment result notification signal of the password;

(G) password input control means which, when function selection switches are manipulated during a "password input mode," receives command input of the function selection switches that is outputted from the switch state detection means and causes display on the display means requesting input of a password; which outputs to the input password judging means when the password is outputted from the switch state detection means; and which transfers the password judgment result notification signal from the input password judging means to the switch state detection means; and (H) password input mode setting means that sets and cancels the "password input mode" by the switches in accordance with a menu screen displayed on the display means.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 2:
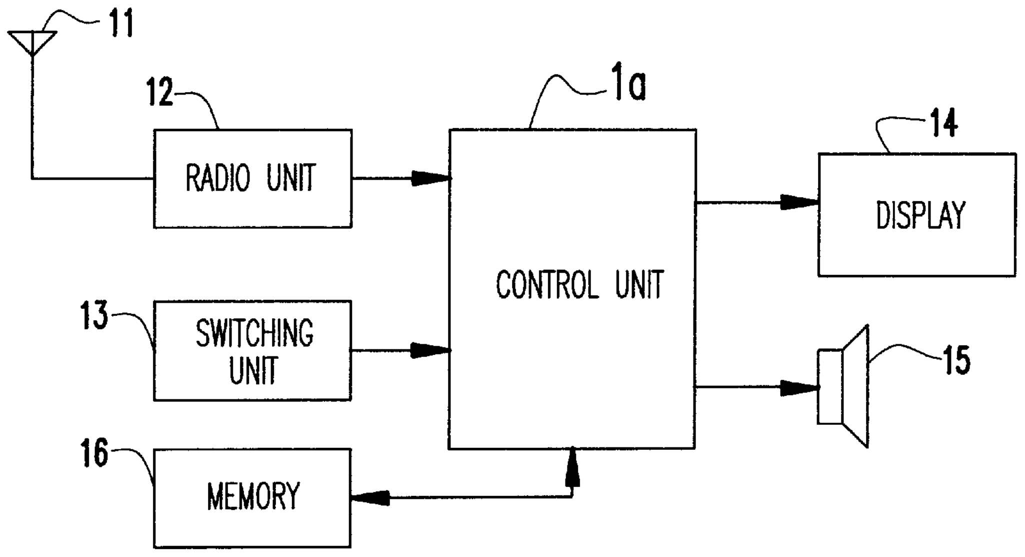
FIG. 2 is a block diagram showing the construction of one embodiment of the radio selective calling receiver of the present invention.
Figure 3:
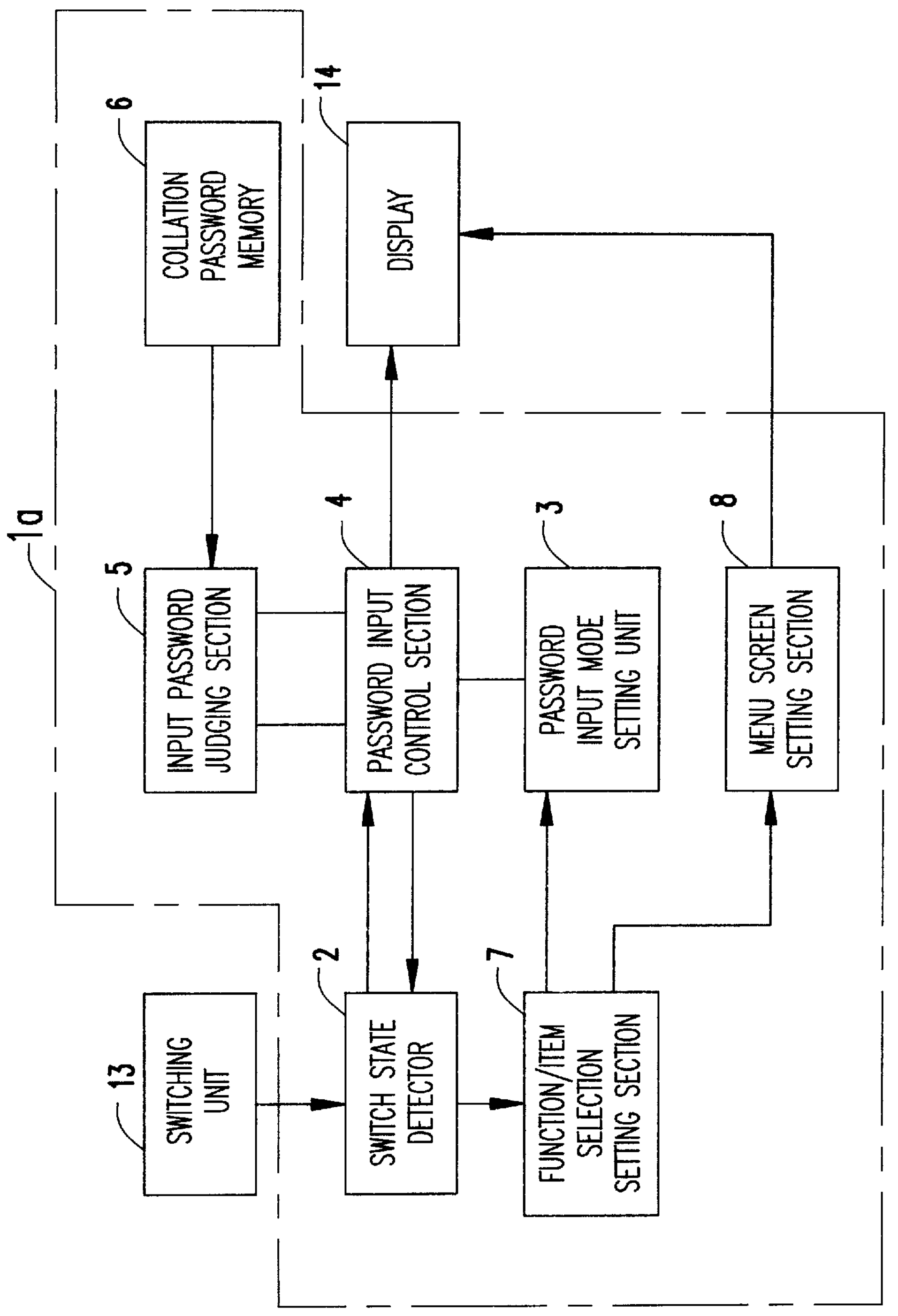
FIG. 3 is a block diagram showing the construction of the control unit of the radio selective calling receiver shown in FIG. 2.
Figure 4:
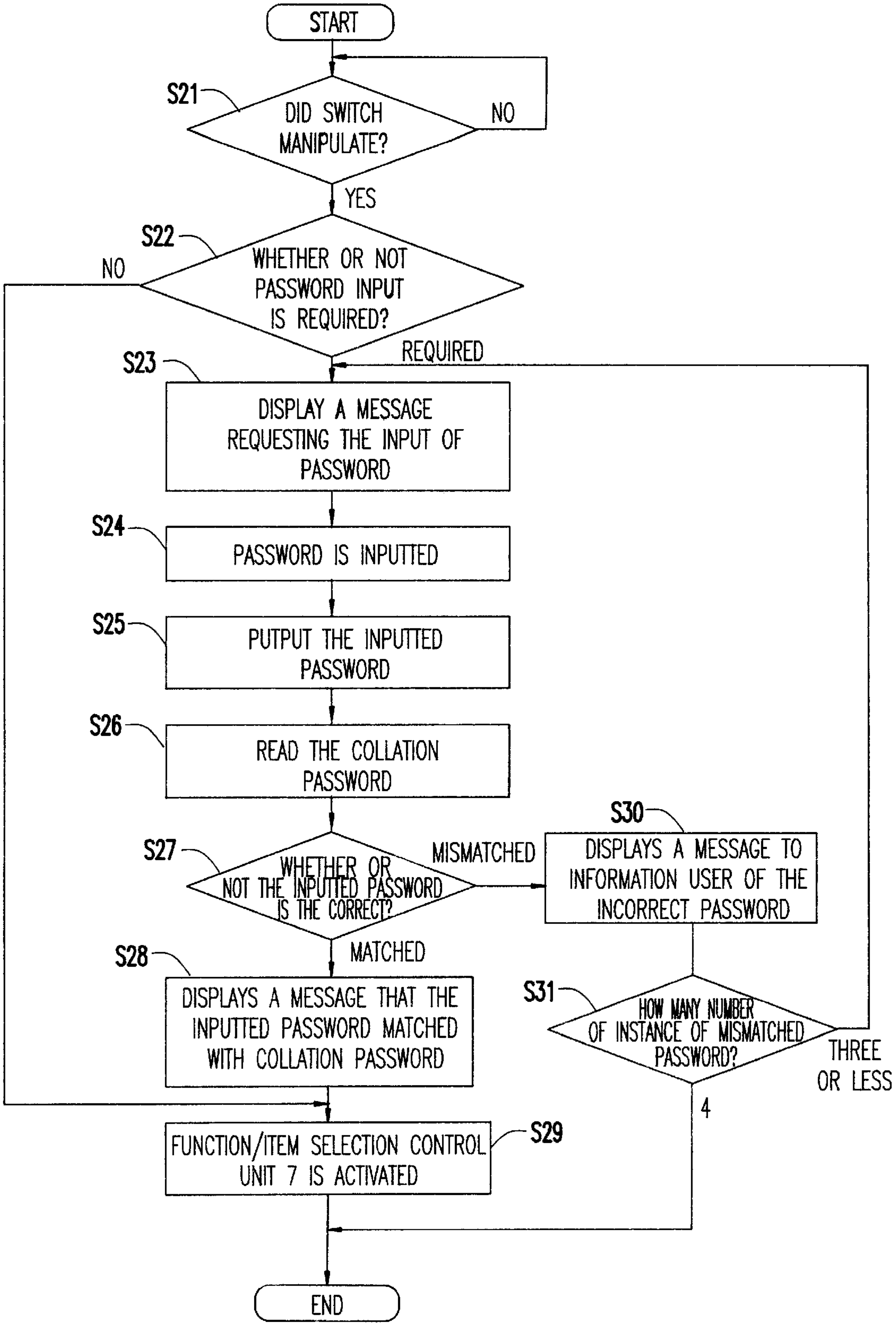
FIG. 4 is a flowchart showing one example of the operation of the radio selective calling receiver of the present invention shown in FIG. 2.

An embodiment of the present invention will next be described with reference to the accompanying figures. FIG. 2 is a block diagram showing the construction of one embodiment of the radio selective calling receiver of the present invention. FIG. 3 is a block diagram showing the construction of the control unit of the radio selective calling receiver shown in FIG. 2. FIG. 4 is a flowchart showing an example of the operation in the radio selective calling receiver shown in FIG. 2.

Figure 1:
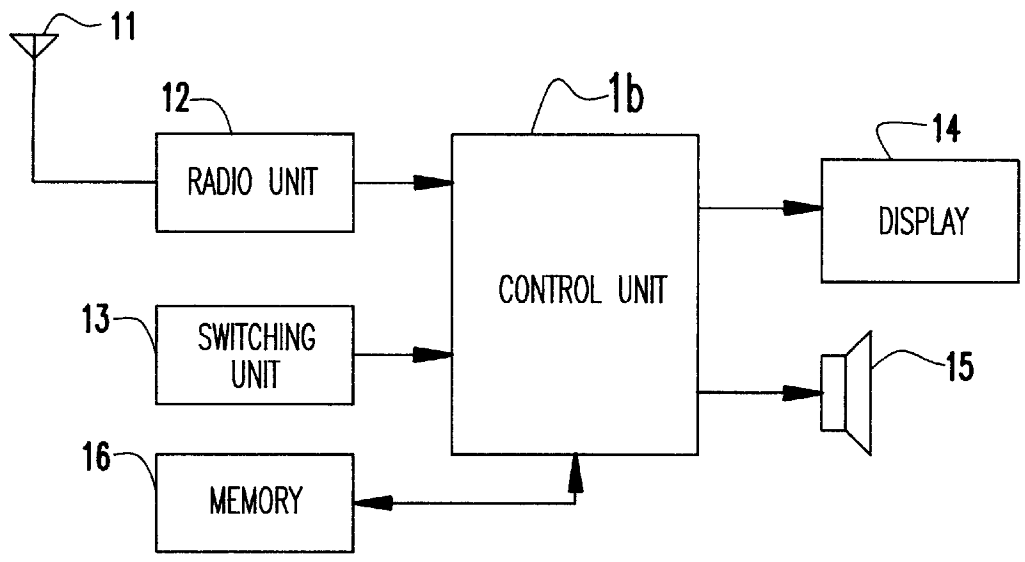
FIG. 1 PRIOR ART
FIG. 1 is a block diagram showing the construction of a radio selective calling receiver of the prior art.

The radio selective calling receiver shown in FIG. 2 is made up of antenna 11, radio unit 12, switch unit 13, display 14, speaker 15, memory 16, and a control unit 1*a* that controls the operation of each of the above-described components, and with the exception of the control unit, the radio selective calling receiver of FIG. 2 is identical in construction with the radio selective calling receiver of the prior art shown in FIG. 1, i.e., the radio selective calling receiver shown in FIG. 2 differs from the radio selective calling receiver of the prior art shown in FIG. 1 only in that it is provided with control unit 1*a* in place of control unit 1*b*. Accordingly, explanation of the basic operation of the radio selective calling receiver shown in FIG. 2 would be identical to the that of the prior-art radio selective calling receiver shown in FIG. 1 described in the section on the related art, and explanation is therefore here omitted.

The internal construction of control unit 1*a* of the radio selective calling receiver of this embodiment as well as the operation of the radio selective calling receiver of the present invention is described hereinbelow.

Control unit 1*a* shown in FIG. 3 is made up of switch state detector 2, password input mode setting unit 3, password input control unit 4, input password judging section 5, collation password memory 6, function/item selection control unit 7, and menu screen setting section 8.

Control unit 1*a* is characterized by effecting control of the various functions of the radio selective calling receiver while distinguishing between the "password input mode" which requires password input and "password input not required mode" that does not require password input. The operation of each component making up control unit 1*a* will first be explained.

Switch state detector 2 detects the state of manipulation of switch unit 13, and upon receiving command input through the function selection switches provided in switch unit 13 for selecting functions during the "password input mode" that requires password input, temporarily stores this command input to memory 16, and continues to store the input until the correct password is inputted. After the correct password has been inputted, switch state detector 2 outputs the stored command input to function/item selection control unit 7.

In contrast, upon receiving command input through the function selection switches during the "password input not required mode" that does not require password input, switch state detector 2 immediately outputs command input by the function selection switches directly to function/item selection control unit 7.

Upon manipulation of an item selection switch, which is a switch provided in switch unit 13 for command input of selected items, the command input is immediately outputted directly to function/item selection control unit 7 regardless of whether the "password input mode" or the "password input not required mode" is in effect, and when a password is inputted, the password is immediately outputted directly to password input control unit 4.

Collation passwords for matching with inputted passwords are stored in advance in collation password memory 6.

Input password judging section 5 collates a password inputted by switch operation with a collation password read from collation password memory 6 and judges whether or not the two match, and outputs to password input control unit 4 a password judgment result notification signal indicating whether or not a match has occurred and whether the input password is correct.

When function selection switches are manipulated during the "password input mode," password input control unit 4 receives command input of the function selection switches outputted from switch state detector 2, displays a message requesting input of a password on display 14, and when a password inputted by switch manipulation is inputted by way of switch state detector 2, outputs this password to input password judging section 5. Password input control unit 4 then transfers the password judgment result notification signal outputted from input password judging section 5 to switch state detector 2.

Function/item selection control unit 7 outputs an "enable selected function" signal and a "direct selected item" signal having a content according to the command input outputted from switch state detector 2.

Password input mode setting unit 3 sets or cancels the "password input mode" by switch operation in accordance with a menu screen displayed on display unit 14.

Menu screen setting section 8 receives a command signal directing display of a menu screen from function/item selection control unit 7 and displays the menu screen on display 14.

Finally, the operation of control unit 1*a* is realized through the operation of an installed microprocessor.

The operation of this embodiment will next be explained.

The radio selective calling receiver enters a "call waiting mode," which is a state in which the radio selective calling receiver is ready to accept incoming calls, when the power switch (not shown) is turned ON. When necessary, the user may switch to a "menu mode" in which a menu screen is displayed on display 14 by operating a function selection switch that allows selection of a menu screen from among the function selection switches, which are switches for selecting functions incorporated in switch unit 13.

The above-described "menu mode" is set for displaying menu screens needed when reading out from memory 16 and displaying pre-stored telephone numbers of contacts when calls come in or text of set format represented by abbreviations that is used in radio selective calling receiver messages, or when setting whether or not password input is required.

If a call has been received and the radio selective calling receiver is in the "call waiting mode" or "menu mode," the message received from the caller is read from memory 16 by operating the function selection switch for executing "read received message."

In addition, the menu screen for setting whether or not password input is required can be displayed when in the "menu mode." When set to this menu screen for setting whether or not password input is required, setting can be made for either the "password input mode" in which a password must be inputted every time a command is inputted for selecting any of the various functions, or the "password input not required mode" in which commands may be inputted for selecting the various functions by operating the switches of switch unit 13 without inputting a password.

The setting operation for each of the above-described modes will next be explained with reference to FIG. 4.

In this explanation, the "password input not required mode" will first be taken as the initial state, and the setting is altered from this mode to the "password input mode," following which the setting is again altered to the "password input not required mode."

First, to alter the setting from the "password input not required mode" to the "password input mode," the function selection switch of switch unit 13 for invoking the menu screen is operated while in the "password input not required mode," whereupon switch state detector 2 detects that the function selection switch for invoking the menu screen has been manipulated (Step S21).

Switch state detector 2 next confirms whether or not password input is required (Step S22). As will be explained hereinbelow, the notification that setting has been made to the "password input not required mode" is received in advance from password input mode setting unit 3 by way of password input control unit 4 when setting is made to the "password input not required mode." Since password input is not required, when a function selection switch is operated, switch state detector 2 immediately sends to function/item selection control unit 7 the menu screen call command signal that invokes the menu screen corresponding to the manipulated function selection switch, and function/item selection control unit 7 is activated (Step S29).

Function/item selection control unit 7 outputs to menu screen setting section 8 a menu screen call command signal for invoking the menu screen, and menu screen setting section 8 displays the menu screen on display 14.

When the item selection switch is operated to invoke the screen for setting whether or not password input is required, the menu screen that allows selection and setting of either the "password input mode" or "password input not required mode" is displayed. Here, when the device user manipulates the item selection switch for selecting the "password input mode," the manipulation of this item selection switch is detected by switch state detector 2. Switch state detector 2 outputs the command input to this item selection switch to function/item selection control unit 7. Function/item selection control unit 7 sends the command input from switch state detector 2 to password input mode setting unit 3. Alteration of setting from "password input not required mode" to "password input mode" takes place at password input mode setting unit 3. Password input mode setting unit 3 notifies password input control unit 4 that setting has been changed to the "password input mode." Switch state detector 2 is notified from password input control unit 4 that setting has been changed to the "password input mode," thus completing the operation for changing setting to the "password input mode." When the function selection completed operation switch of switch unit 13 is subsequently manipulated to return to the "call waiting mode" from "menu mode," the operation of this switch is detected by switch state detector 2. The detection of this manipulation of the function selection completed operation switch by switch state detector 2 resets the operation of the activated menu screen setting section 8 and password input mode setting unit 3, and the operating state of the radio selective calling receiver switches from the "menu mode" back to the "call waiting mode." In this state, all subsequent selections of functions of the radio selective calling receiver will additionally require password input.

The operations for changing the setting from "password input mode" to "password input not required mode" while the radio selective calling receiver is in the "password input mode" will next be explained.

When the function selection switch of switches 13 for invoking a menu screen is manipulated, switch state detector 2 detects that function selection switch for invoking a menu screen has been manipulated (Step S21). Switch state detector 2 confirms whether or not password input is required (Step S22). Here, switch state detector 2 has received notification beforehand that a setting has been made to "password input mode" from password input mode setting unit 3 by way of password input control unit 4 when setting was made to the "password input mode" that requires input of a password. As a result, when a function selection switch is manipulated, switch state detector 2 outputs to password input control unit 4 a password input request notification signal, which notifies that a request for input of a password must be made, and until the correct password has been inputted, the menu screen call command signal that is generated by a manipulated function selection switch to invoke a menu screen is temporarily stored in switch state detector 2.

Password input control unit 4, which has received the password input request notification signal from switch state detector 2, has also received notification beforehand when setting was made to the "password input mode" that setting was made to "password input mode" from password input mode setting unit 3, and as a result, displays a message requesting the input of a password on display 14 (Step S23). When a password is inputted based on the message displayed on display 14 (Step S24), the plurality of switch manipulations performed to input the password are detected by switch state detector 2 and are successively outputted to password input control unit 4. Password input control unit 4 outputs the inputted password to input password judging section 5 (Step S25). Input password judging section 5 reads the collation password from collation password memory 6 (Step S26), collates the inputted password with the collation password, and judges whether or not the inputted password is the correct password (Step S27). This judgment result is outputted to password input control unit 4 as a password judgment result notification signal. If the collation password matches the inputted password, password input control unit 4 displays on display 14 a message indicating that the correct password has been inputted and has matched with the collation password (Step S28), and sends to switch state detector 2 a signal indicating that the correct password has been inputted.

At switch state detector 2 it is stored that a correct password has been inputted and that a "functions being selected" state is in effect. While in this state, notification requesting password input is not sent from switch state detector 2 to password input control unit 4 despite the manipulation of switches of the switch unit. In addition, this "functions being selected" state continues until eliminated upon completion of the function selection operation. Switch state detector 2 receives a password judgment result notification signal from password input control unit 4 indicating that a correct password has been inputted, reads the menu screen call command signal that was temporarily stored before the input of the password and sends it to function/item selection control unit 7, whereby function/item selection control unit 7 is activated (State S29). Function/item selection control unit 7 outputs to menu screen setting section 8 a menu screen call command signal to invoke the menu screen. Menu screen setting section 8 is activated and causes a menu screen to be displayed on display 14. When switch state detector 2 detects the manipulation of the item selection switch according the menu screen in order to display the screen for setting whether or not password input is to be required, switch state detector 2 outputs the command inputted by the item selection switch to function/item selection control unit 7. Upon receiving this command input, function/item selection control unit 7 activates password input mode setting unit 3. When password input mode setting unit 3 is activated, the menu screen for setting whether or not password input is to be required is displayed on display 14. When the item selection switch for selecting "password input not required mode" is manipulated based on this screen, the manipulation of this item selection switch is detected by switch state detector 2, and switch state detector 2 outputs the command input that is inputted by means of this manipulation of item selection switches to function/item selection control unit 7. Function/item selection control unit 7 sends this command input to password input mode setting unit 3. Alteration of the setting from "password input mode" to "password input not required mode" is performed at password input mode setting unit 3. Password input mode setting unit 3 notifies password input control unit 4 that the setting has been changed to "password input not required mode." Switch state detector 2 is notified from password input control unit 4 that the setting has been changed to "password input not required mode." The setting is changed to "password input not required mode" whereby the mode setting operation is completed, and as a result, when a function selection completed operation switch of switch unit 13 is operated to return to "call waiting mode" from "menu mode," this switch manipulation is detected by switch state detector 2. The detection of the manipulation of the "function selection completed operation switch" by switch state detector 2 causes the elimination of data stored until this time indicating that the "function being selected" state is in effect. Moreover, the operations of menu screen setting section 8 and password input mode setting unit 3, which had been activated to this point, are reset, and the operating state of the radio selective calling receiver reverts from "menu mode" to "call waiting mode." In this state, the requirement for password input each time functions of the radio selective calling receiver are selected is relaxed. Each of the various functions of the radio selective calling receiver can be selected and immediately activated through operation of function selection switches and operation of item selection switches.

When the judgment results of Step S27 shows a mismatch between an inputted password and the collation password read from collation password memory 6, a signal indicating that inputted password and collation password do not match is sent from input password judging section 5 to password input control unit 4. Password input control unit 4 sends to display 14 a display control signal to indicate that the inputted password is incorrect, and display 14 displays a message to inform the user of the incorrect password (Step S30). Password input control unit 4 further counts the number of instances of mismatched passwords (Step S31), and if this number is three or less, sends a display control signal to display 14 to bring about display of a message requesting re-entry of a password, and display 14 displays this message (Step 23). When the number of instances of mismatched passwords reaches 4, password input control unit 4 halts operation.

Next will be explained a case in which a message from a caller received from an incoming call is read from memory 16 during the "password input mode."

When function selection switches are operated to direct reading of a received message from memory 16, a message requesting input of a password is displayed on display 14 as in the case described hereinabove. When a correct password is not inputted, the command signal for the function selection to read the received message from memory 16 continues to be stored in switch state detector 2. When the correct password is inputted, the conmmand signal for the function selection to read the message from memory 16 is outputted from switch state detector 2 to function/item selection control unit 7. Upon receiving this command, function/item selection control unit 7 activates the received message read-out unit (not shown) which has the function of reading received messages from memory 16. The message is thus read from memory 16 and displayed on display 14. After the read message is confirmed, switches are operated to direct the completion of function selection in order to return the radio selective calling receiver to a "call waiting mode," switch state detector 2 detects the operation of the function selection completed operation switch, and the stored data indicating that the "function being selected" state is in effect are eliminated. If the function selection switches are manipulated to again have received data read out and displayed on display 14, a message requesting password input is again displayed on display 14, and as a result, received data cannot be read out or displayed on display 14 unless the password is again inputted.

As described hereinabove, the radio selective calling receiver of the present invention enables setting of a password input mode in which, when a function is selected, operation is not allowed unless the password is inputted; and if the setting of this password input mode is in effect, when a user manipulates switches corresponding to functions the user wishes to select, the switch output is detected, a request for password input is displayed, and when the user inputs the correct password, the selected functions are activated. If the password input mode is not set, however, selected functions are activated immediately upon manipulation of a function selection switch. In this way, confidentiality may be maintained when necessary by setting the password input mode, thereby making the radio selective calling receiver inoperable by anyone who does not know the password. If, for example, a third party should gain access to and operate the switches of the radio selective calling receiver through a lapse in vigilance over the radio selective calling receiver, the third party will nevertheless be unable to operate the radio selective calling receiver. The invention therefore has the effect of preventing breaches in privacy and allowing an improvement in confidentiality.

In addition, the use of a function menu invoked by a password allows changes such that when password input is not necessary, switch operation may be allowed without password input, and the invention therefore also has the effect of allowing easy switch operation when handling data that do not require confidentiality.

Finally, because the user of the radio selective calling receiver may set whether password input is required or not according to necessity when using the radio selective calling receiver, the invention has the further effect of allowing relief from the inconvenience of performing the operations for password input.

It is to be understood, however, that although the characteristics and advantages of the present invention have been set forth in the foregoing description, the disclosure is illustrative only, and changes may be made in the arrangement of the parts with in the scope of the appended claims.

What is claimed is:

1. A radio selective calling receiver which operates in a "password input mode" that requires input of a password when receiver functions are selected and in a "password input not required mode" that does not require input of a password when receiver functions are selected, said receiver comprising:

a control unit which, when switches are manipulated to select functions in said "password input mode," displays a message directing input of a password, following which correct input of said password is checked before a function selected by said switches is activated, and which, when switches are manipulated to select functions in said "password input not required mode," causes said selected functions to be immediately activated; and a unit which sets and alters said "password input mode" and said "password input not required mode" in accordance with selections on a menu screen.

2. A radio selective calling receiver comprising an antenna that receives radio waves from a base station, a radio unit that generates and outputs a digital signal transmitted from a base station by demodulating a radio frequency signal outputted from said antenna, a memory that stores data inputted from a subscriber and received data from a base station, and a control unit that controls operation of said receiver, wherein when functions are selected, said control unit executes different control depending on whether a "password input mode" that requires input of a password or a "password input not required mode" that does not require input of a password is in effect, and said control unit further comprises:

(A) function/item selection control means that controls selection and activation of functions as well as selection of selection items;

(B) display means that displays menu screens including screens for selecting said functions and said selection items;

(C) menu screen setting means that generates said menu screens;

(D) switch state detection means which detects a manipulated state of said switches and which, if function selections switches are manipulated during said "password input mode" that requires input of a password when selecting functions, stores command input by said selection switches into said memory until input of a correct password, reads out said command input stores in said memory when said password is correctly inputted and outputs to said function/item selection control means; if function selection switches are manipulated during a "password input not required mode" that does not require input of a password when selecting functions, immediately outputs said command input to said function/item selection control means; and which, when a command input switch of a selection item is manipulated, immediately outputs to the function/item selection control means whether in the "password input mode" or "password input not required mode";

(E) collation password storage means that stores in advance collation passwords for collating with said inputted password;

(F) input password judgment means that collates a password inputted by said switches with a collation password that is read from said memory and judges whether there is a match or not, and outputs a judgment result notification signal of said password;

(G) password input control means which, when function selection switches are manipulated during said "password input mode," receives command input of said function selection switches that is outputted from the switch state detection means and causes display requesting input of a password on said display means; which outputs to said input password judging means when said password is outputted from said switch state detection means; and which transfers said password judgment result notification signal from said input password judging means to said switch state detection means; and (H) password input mode setting means that sets and cancels said "password input mode" by said switches in accordance with a menu screen displayed on said display means.

3. A radio selective calling receiver comprising:

password input mode setting means for setting said receiver to operate in a "password input mode" or a "password input not required mode," said "password input mode" corresponding to a mode which requires input of a password in order for functions of said receiver to be selected and said "password input not required mode" corresponding to a mode which does not require input of a password for said functions to be selected;

switching means for selecting said functions;

means for immediately activating said functions when said functions are selected by said switching means and said receiver is in said "password input not required mode;" and means for displaying a message requesting input of a password when said functions are selected by said switching means and said receiver is in said "password input mode."

4. The radio selective calling receiver of claim 3, further comprising:

means for storing a correct password;

means for receiving input of a password;

judging means for comparing said input password to said correct password; and selecting means for selecting said functions in said "password input mode" when said judging means determines that said input password matches said correct password in said memory.

5. The radio selective calling receiver of claim 3, wherein said message display means displays a menu for allowing a user to set or alter said receiver to one of said "password input mode" and said "password input not required mode."

6. A method for controlling access to messages received by a radio selective calling receiver, comprising:

setting said receiver to operate in a "password input mode" or a "password input not required mode," said "password input mode" corresponding to a mode which requires input of a password in order for functions of said receiver to be selected and said "password input not required mode" corresponding to a mode which does not require input of a password for said functions to be selected;

selecting said functions;

immediately activating said functions in response to selection of said functions and when said receiver is in said "password input not required mode;" and displaying a message requesting input of a password in response to selection of said functions and when said receiver is in said "password input mode."

7. The method of claim 6, further comprising:

storing a correct password;

receiving input of a password;

comparing said input password to said correct password; and selecting said functions in said "password input mode" when said input password matches said correct password in said memory.

8. The method of claim 7, further comprising:

displaying a menu for allowing a user to set or alter said receiver to one of said "password input mode" and said "password input not required mode."

* * * * *